United States Patent [19]
Sartor

[11] Patent Number: 5,936,701
[45] Date of Patent: Aug. 10, 1999

[54] EYEGLASSES

[76] Inventor: Rino Sartor, Via Trevignano, 10, 31044 Montebelluna, Italy

[21] Appl. No.: 09/062,325

[22] Filed: Apr. 20, 1998

[30] Foreign Application Priority Data

Apr. 23, 1997 [IT] Italy .................................. PD97A0086

[51] Int. Cl.⁶ ..................................................... G02C 1/02
[52] U.S. Cl. ............................ 351/110; 351/116; 351/140
[58] Field of Search ..................................... 351/116, 110, 351/140, 153, 113, 114, 111, 124, 41, 158; 16/228

[56] References Cited

U.S. PATENT DOCUMENTS 5,539,561   7/1996   Khalifa ...................................... 351/140

*Primary Examiner*—Hung Xuan Dang
*Attorney, Agent, or Firm*—Guido Modiano; Albert Josif

[57] ABSTRACT

A pair of eyeglasses of the type which comprises a front which is constituted by lenses with which temples are associated. The eyeglasses are characterized in that each one of the temples comprises an anchoring end section which is shaped so as to form an elastic clip which can be detachably fixed, in a snap-together manner, in a preset seat formed in an outer end region of the corresponding lens.

8 Claims, 2 Drawing Sheets

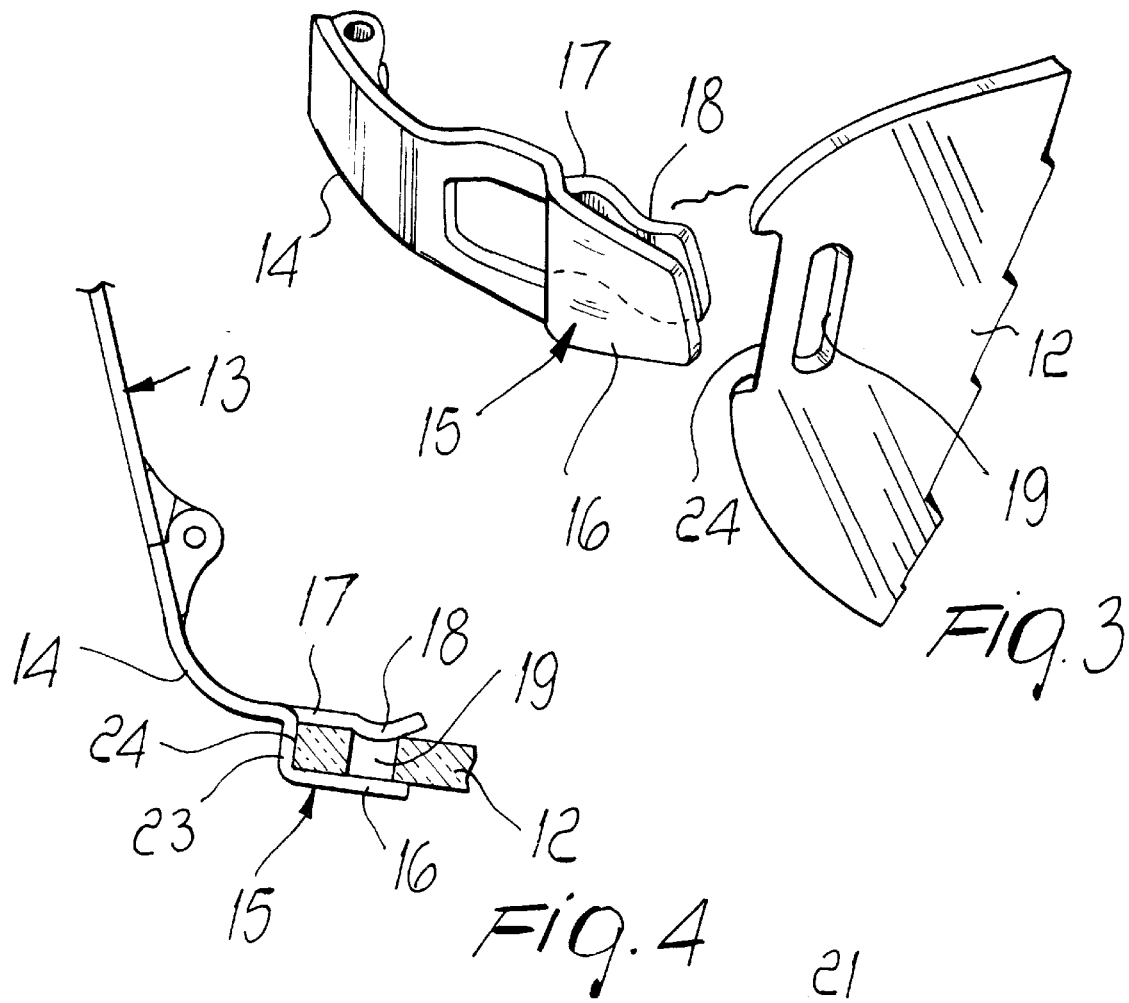
Fig. 3
Fig. 4
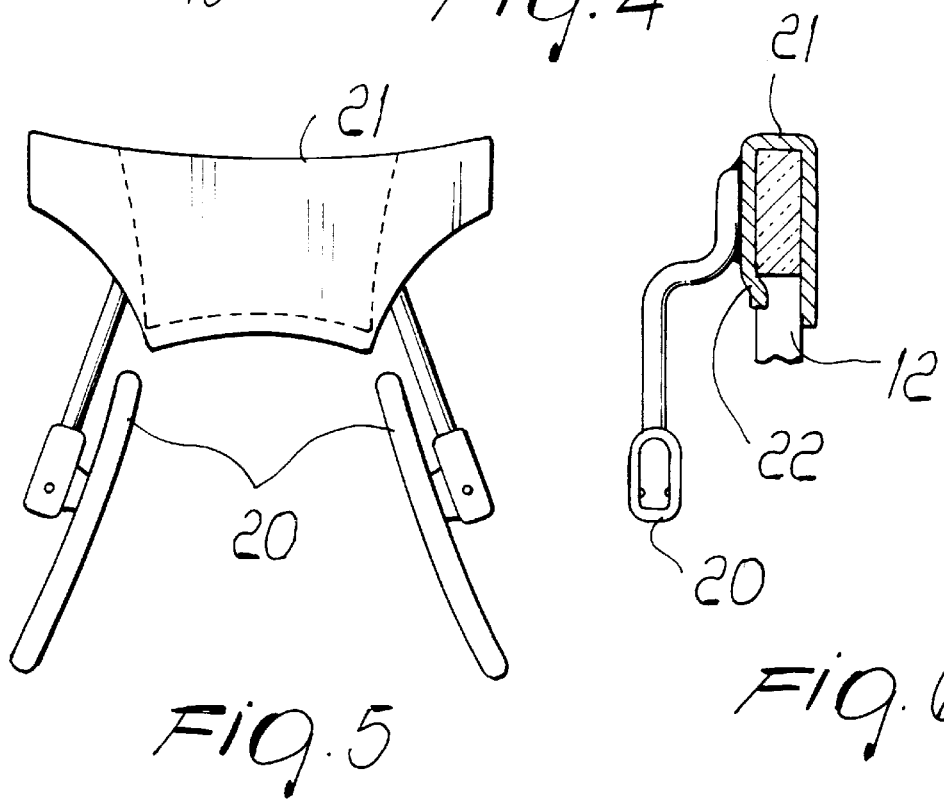
Fig. 5
Fig. 6 ns. 5,936,701

EYEGLASSES

BACKGROUND OF THE INVENTION

The present invention relates to a pair of improved eyeglasses.

It is known that visor-shaped eyeglasses have long been used, particularly in the sports field, in which the main function is to protect the eyes for example from light but also from foreign bodies or objects which can be in the air or can be propelled against the eyes.

Visor-type eyeglasses are currently substantially constituted by a front with self-supporting or supported lenses with which the temples are associated and articulated.

In particular, in many cases in conventional visor-type eyeglasses the temples are connected to the visor by means of an anchoring section which is fixed monolithically or by means of threaded elements.

In other cases, the temples are fixed and articulated to a supporting top part to which the visor is fixed.

These currently commercially available constructive types, owing to their structure, are often particularly troublesome to manufacture, forcing high production costs and sometimes limiting practicality and functionality in operation.

SUMMARY OF THE INVENTION

The aim of the present invention is to provide visor-type eyeglasses which are particularly sturdy and can be assembled easily.

Within the scope of this aim, an object of the present invention is to provide eyeglasses the structure of which can be applied to the most disparate fields of application, such as for example sports requiring eye protection or various activities which require protecting the eyes from foreign objects.

Another object of the present invention is to provide a structure which allows easy modularity. so as to provide different models in terms of choice and assembly of various types of components, temples, visors, nose pads which are mutually compatible.

Another object of the present invention is to provide eyeglasses which can be manufactured in models which have good styling and aesthetic qualities.

Another object of the present invention is to provide eyeglasses which can be manufactured with conventional equipment.

This aim, these objects and others which will become apparent hereinafter are achieved by a pair of eyeglasses, comprising a front which is constituted by lenses with which corresponding temples are associated, characterized in that each one of said temples comprises an anchoring end section which is shaped so as to form an elastic clip which can be detachably fixed, in a snap-together manner, in a preset seat formed in an outer end region of the corresponding lens.

BRIEF DESCRIPTION OF THE DRAWINGS

Further characteristics and advantages of the present invention will become apparent from the description of an embodiment thereof, illustrated only by way of non-limitative example in the accompanying drawings, wherein:

FIG. 3 is an exploded view of a detail of the eyeglasses of FIG. 1;

FIG. 4 is an orthographic sectional projection view of the detail of FIG. 3;

FIG. 5 is a sectional view of another detail of the eyeglasses of FIG. 1;

FIG. 6 is a partially sectional view of the detail of FIG. 5.

DESCRIPTION OF THE PREFERRED EMBODIMENTS

Figure 1:
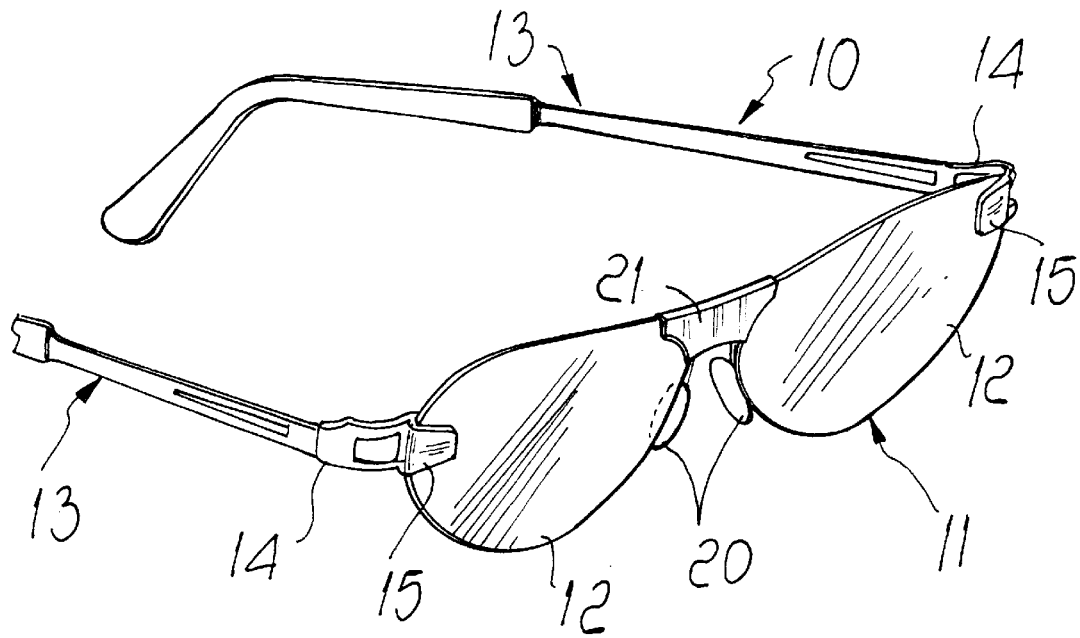
FIG. 1 is a perspective view of the eyeglasses according to the present invention.
Figure 2:
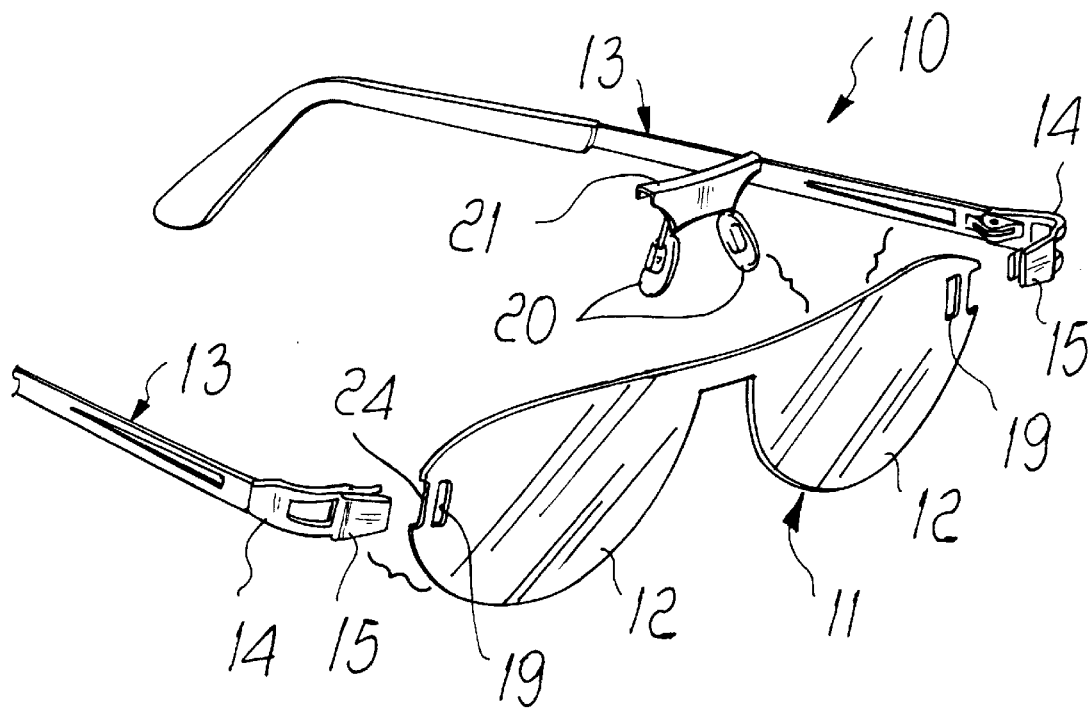
FIG. 2 is an exploded view of the eyeglasses of FIG. 1.

With particular reference to FIGS. 1 to 6, the eyeglasses according to the invention are generally designated by the reference numeral 10.

The eyeglasses 10, in this case, comprise a front 11 which is constituted by two lenses 12 which are monolithically connected to each other and are self-supporting; temples 13 are associated with said lenses and articulated to them.

In this case, each one of the temples 13 comprises an anchoring end section 14 which is shaped so as to form an elastic clip 15 which can be fixed detachably, with a snap action, in a suitable seat which is described hereinafter and is formed in the peripheral region of the outer end of the corresponding lens 12.

In particular, each one of the temples 13 is composite in this case, since it is composed of the corresponding anchoring section 14 which is articulated to the rest of said temple 13.

In this embodiment, each one of the anchoring sections 14 and therefore the corresponding clip 15 are made of metallic material; more specifically, each one of the clips 15 is shaped by blanking a metallic lamina and producing its plastic deformation.

Furthermore, each one of the clips 15 comprises two facing flaps; a first one of said flaps, designated by the reference numeral 16, has a substantially flat inner surface, while a second flap, designated by the reference numeral 17, has an inner surface which is shaped so as to form a raised portion 18 which is suitable to be anchored, during assembly, in said seat, which in this case is constituted by a slotted through hole 19 which is formed at a peripheral region of the outer end of the corresponding lens 12.

As an alternative, it is possible to provide a slot-shaped indent.

The portion 23 that mutually connects the flaps 16 and 17 in the assembled configuration is locked within an indent 24 formed on the edge of the lens 12, which helps to lock it to maintain the correct orientation.

The eyeglasses 10 also comprise nose pads 20, which are associated with a bridge 21 which is shaped, as a whole, so as to form an elastic clip which is anchored by snap action to the portion that connects the two lenses 12.

An edge portion of the bridge 21, designated by the reference numeral 22, is shaped so as to form an undercut which ensures the locking thereof upon anchoring.

In practice, it has been found that the present invention has achieved the intended aim and objects.

In particular, it should be noted that the eyeglasses according to the invention, despite their structural simplicity, are particularly sturdy and easy to assemble.

It should also be noted that the structure of the eyeglasses according to the invention allow various configurations which are suitable to adapt to the most disparate applications by keeping one of the components unchanged and changing the others.

It should also be noted that it is also optionally possible to quickly replace the components.

The present invention is susceptible of numerous modifications and variations, all of which are within the scope of the inventive concept; likewise, the details may be replaced with other technically equivalent elements.

The materials and the dimensions may be any according to the requirements.

What is claimed is:

1. A pair of eyeglasses, comprising;

a front which is constituted by a pair of monolithically connected lenses, each one of said lenses having an outer end region;

a pair of temples, each one of said temples being connected with a corresponding lens of said lenses, and each one of said temples having an anchoring end section which is shaped so as to form an elastic clip which is detachably fixed, in a snap-together manner, in a preset seat formed in the outer end region of the corresponding lens.

2. The pair of eyeglasses of claim 1, wherein said elastic clip of said anchoring end section of each one of said temples is obtained by blanking and plastic deformation from a metallic lamina.

3. The pair of eyeglasses of claim 1, wherein said elastic clip of said anchoring end section of each one of said temples comprises two facing flaps, a first flap of said two facing flaps having a substantially flat inner surface, a second flap of said two facing flaps having an inner surface which is shaped so as to form a raised portion which is accommodated, on assembly, in said seat.

4. The pair of eyeglasses of claim 3, wherein said two facing flaps of said elastic clip of said anchoring end section of each one of said temples are connected by a connecting portion which, in an assembled configuration, is locked within an indent formed on an edge of the front.

5. The pair of eyeglasses of claim 1, wherein said seat of each outer end region of each lens comprises any one of a slotted indent and a slotted through hole formed in the corresponding lens.

6. The pair of eyeglasses of claim 1, wherein said pair of monolithically connected lenses form a self-supporting monolithic visor.

7. The pair of eyeglasses of claim 1, further comprising a bridge and nose pads connected to said bridge, said bridge being connected by snap action with a connecting portion for mutually connecting said lenses.

8. The pair of eyeglasses of claim 7, wherein said bridge is shaped so as to form an elastic clip which is anchored by snap action to the connecting portion for mutually connecting said lenses.

* * * * *